United States Patent [19]

Story et al.

[11] Patent Number: 5,015,264

[45] Date of Patent: May 14, 1991

[54] NONPIGMENTARY TITANIUM DIOXIDE POWDERS

[75] Inventors: Phillip M. Story, Yukon; John R. Brand, Oklahoma City, both of Okla.

[73] Assignee: Kerr-McGee Chemical Corporation, Oklahoma City, Okla.

[21] Appl. No.: 244,676

[22] Filed: Sep. 15, 1988

[51] Int. Cl.$^5$ ................................................ C22B 1/14
[52] U.S. Cl. ................................ 23/313 R; 423/610; 423/612; 106/436; 106/437; 501/29; 501/134
[58] Field of Search .................... 423/84, 610, 612; 23/313 R; 106/436, 437; 501/29, 134; 55/91, 95, 223

[56] References Cited

U.S. PATENT DOCUMENTS

| | | | |
|---|---|---|---|
| 2,366,473 | 3/1941 | Bair | 501/29 |
| 2,721,626 | 10/1955 | Rick | 423/612 |
| 2,721,787 | 10/1955 | Hettrick | 423/610 |
| 3,097,075 | 7/1963 | Van den Hoeck | 23/313 R |
| 3,112,210 | 11/1963 | Carpenter | 106/437 |
| 3,365,631 | 1/1968 | Delaney et al. | 501/134 |
| 3,403,977 | 10/1968 | Heywood et al. | 501/29 |
| 3,434,853 | 3/1969 | Heywood | 106/52 |
| 3,447,962 | 6/1969 | Megowen | 23/313 R |
| 3,754,378 | 8/1973 | Christensen et al. | 55/91 |
| 3,795,486 | 3/1974 | Ekman | 55/91 |
| 3,873,335 | 3/1975 | Schmidt et al. | 106/436 |
| 3,956,446 | 5/1976 | Eirch et al. | 501/29 |
| 3,971,642 | 7/1976 | Perez | 55/223 |
| 4,126,422 | 11/1978 | Brandes | 23/313 R |
| 4,311,502 | 1/1982 | Propster | 55/95 |
| 4,781,911 | 11/1988 | Lawhorne | 106/436 |

FOREIGN PATENT DOCUMENTS

1204326 9/1970 United Kingdom ................ 106/436

OTHER PUBLICATIONS

Perry et al., "Chemical Engineer's Handbook", pp. 20-74 to 20-103, 5th Ed., McGraw Hill, 1973.
Engelleitner, Pellets Cutcosts, Improve Quality, The Glass Industry, Mar. 1972, pp. 8-111.
Yamamoto et al., Pelletizing the Glass Batch, The Glass Industry, Sep. 1968, pp. 491-493.

*Primary Examiner*—Helen M. Sneed
*Assistant Examiner*—R. Bruce Breneman
*Attorney, Agent, or Firm*—Herbert M. Hanegan; John P. Ward

[57] ABSTRACT

The present invention is directed to a process for preparing free flowing powders of nonpigmentary titanium dioxide granular aggregates. The process comprises the providing of dried preforms of flocculated pigmentary titanium dioxide and the comminution thereof to powders of granular aggregates of enhanced bulk density and predetermined particle size.

11 Claims, No Drawings

NONPIGMENTARY TITANIUM DIOXIDE POWDERS

FIELD OF THE INVENTION

The present invention relates to a process for preparing free flowing powders suitable for use in the manufacture of glass and ceramic products. Particularly, the invention is directed to a process for preparing free flowing titanium dioxide powders comprised of granular aggregates of a size larger than pigmentary titanium dioxide and which powders are readily dispersible in glass and ceramic melts.

BACKGROUND OF THE INVENTION

Nonpigmentary titanium dioxide is used in the manufacture of various glass and ceramic products for a wide variety of purposes. For example, it is employed in the manufacture of glass frit used in producing vitreous enamel and glaze type coatings and in the manufacture of glass ceramics employed in missile radomes and microwave transmitters. In the former application, the titanium dioxide functions as both an opacifying agent and to enhance the acid resistance of the coatings while in the latter application, it functions as a nucleating agent to effect the nucleation and growth of the major crystalline phases of the glass. Other properties of various glass and ceramic compositions which can be effected through the use of titanium dioxide are those of thermal expansion, chemical durability, refractive index, and the like.

In general, it is believed that the commercially available nonpigmentary titanium dioxides currently employed in the glass and ceramic industries are those produced by the well-known sulfate process. This belief is premised on the fact that nonpigmentary titanium dioxide products readily can be produced through the manipulation of either the crystallization step or calcination step, or both, employed in the sulfate process. Such belief is supported by the disclosures found in U.S. Pat. No. 3,434,853 issued on Mar. 25, 1969. According to this patent, a nonpigmentary titanium dioxide granular material can be produced by calcining, at a temperature of from 800° C. to 1000° C., a titanium hydrate prepared by hydrolyzing a titanium sulfate solution of low titanium concentration at low temperatures to form nodules of aggregated titanium dioxide particles and thereafter, subdividing these nodules into granules. The granules are described as being free flowing and capable of undergoing rapid melting and thorough dispersion when incorporated into a molten glass batch composition.

In contrast, pigmentary titanium dioxide produced by the chloride process, the second major commercial process employed for the manufacture of titanium dioxide, often is unsuited for use in glass and ceramic manufacture. Typically, pigmentary titanium dioxide is so fine and of such low bulk density that it tends to float upon the surface of the glass melt and, as a result, is easily lost through dusting as it is carried out of the glass making vessel by the hot air convection currents generated in the vessel. Fine particle size pigmentary titanium dioxide also tends to form agglomerates in the molten glass batch which agglomerates do not melt properly and which sink to the bottom of the vessel where they form a sintered mass in the glass melt.

SUMMARY OF THE INVENTION

The present invention relates to a process for preparing free flowing powders comprised of nonpigmentary titanium dioxide granular aggregates for use in the manufacture of glass and ceramics.

The process of this invention comprises a sequence of multiple steps the first of which comprises providing solid preforms of flocculated pigmentary titanium dioxide, said preforms having a free water content ranging from about 25 to about 50 weight percent based on the total weight of the preforms. In a second step of the process, the solid preforms are subjected to drying at elevated temperatures whereby the free water content of the preforms is reduced to a level of less than about 5 weight percent. Finally, the dried preforms are comminuted to effect a reduction in size of the preforms and produce a free flowing powder of nonpigmentary titanium dioxide granular aggregates. The free flowing powder is characterized by a bulk density ranging broadly from about 0.5 to about 3.5 g./cc. It is comprised of nonpigmentary titanium dioxide granular aggregates, a substantial portion of which range in size from a minimum limiting particle size of about 150 microns to a maximum limiting particle size of about 1700 microns.

In a further embodiment of the invention the free flowing powder can be subjected to size enlargement where the maximum limiting particle size remains at about 1700 microns but wherein the particle size distribution of the granular aggregates is narrowed by agglomeration of those granular aggregates having particle sizes smaller than about 150 microns.

DETAILED DESCRIPTION OF THE INVENTION

The surprising discovery now has been made of a process for conveniently and economically converting pigmentary titanium dioxide into free flowing powders of nonpigmentary titanium dioxide granular aggregates. Broadly, the present invention comprises providing solid preforms of pigmentary titanium dioxide, drying the preforms to reduce the free water content thereof and thereafter subjecting the dried preforms to comminution to produce the free flowing powders of nonpigmentary titanium dioxide granular aggregates.

The present invention is particularly suited to the conversion of pigmentary titanium dioxide produced by way of the so-called "chloride process". Broadly, the chloride process comprises chlorinating a titaniferous ore to produce titanium tetrachloride and then oxidizing the titanium tetrachloride, in the vapor phase, to produce a hot, solids-gaseous reaction mixture. Typically, this hot, solids-gaseous reaction mixture will comprise particulate, pigmentary titanium dioxide suspended in a gaseous mixture of unreacted titanium tetrachloride, chlorine, oxygen and hydrogen. The hot solids-gaseous reaction stream further may contain an inert refractory material, such as sand, of a particle size larger than that of the pigmentary titanium dioxide being produced. In general, this inert refractory material is added to the reaction vessel in which the vapor phase oxidation is conducted to prevent or substantially minimize the deposition of the particulate pigmentary titanium dioxide on the inner surfaces of the reaction vessel.

The hot solids-gaseous reaction mixture exiting the reaction vessel is rapidly cooled to prevent any further growth of the particulate pigmentary titanium dioxide product and this reaction mixture then separated into its solids and gaseous constituents. Various means have been employed to effect this separation although, typically, cyclones and bag filters are the most widely used means. To improve the economics of the chloride process, the unreacted titanium tetrachloride and chloride components usually are recovered and recycled for reuse in the process.

The separated and recovered particulate pigmentary titanium dioxide and any inert refractory material which may have been employed in the oxidation step then are dispersed in water in a suitable vessel to form a slurry having a solid pigmentary titanium dioxide content of from about 25 to about 70 weight percent and preferably from about 30 to about 50 weight percent. In general, good dispersion of the pigmentary titanium dioxide in this slurry is achieved at slurry pH's of below about 4 and above about 8. To maintain this good dispersion and prevent flocculation of the dispersed pigmentary titanium dioxide during the subsequent milling and classification steps employed in the chloride process, it is usual practice to add to the slurry a stabilizing amount of either an appropriate mineral acid or inorganic base. A stabilizing amount will comprise any amount capable of maintaining the slurry pH below about 4 or above about 8. Representative of useful mineral acids are hydrochloric and sulfuric acids while useful inorganic bases include any of the well-known hydroxides, bicarbonates and carbonates of ammonia and the alkali and alkaline earth metals. Representative examples of such base materials include sodium hydroxide, potassium hydroxide, ammonium hydroxide, calcium hydroxide, sodium carbonate, sodium bicarbonate, potassium carbonate, and the like.

To further enhance the stability of the above described slurry it also is usual practice to add to the slurry an additional dispersant material. This additional dispersant material can include any of the various primary, secondary and tertiary amines employed for such purposes as well as various water soluble phosphates and particularly the phosphates of sodium, potassium, lithium and ammonia. Particularly useful additional dispersant materials which can be employed for improving the dispersion characteristics of the slurry are the tripolyphosphates, hexametaphosphates and tetraphosphates of sodium.

When the slurry comprises a mixture of pigmentary titanium dioxide and an inert refractory material such as sand, the slurry then is subjected to classification to effect a separation of the larger particle size inert refractory material from the finer particle size pigmentary titanium dioxide contained in the slurry.

Following removal of the inert refractory material from the slurry, the slurry is subjected to milling and further classification. The slurry containing the dispersed pigmentary titanium dioxide, then is flocculated either by adjustment of the slurry pH to a value in the range of from about 4 to about 8 by addition of an acid or base such as disclosed hereinabove, or by the addition of a flocculating agent. Suitable flocculating agents include inorganic agents such as, for example, magnesium sulfate and organic agents such as, for example, polymeric polyacrylamides. Finally, the flocculated slurry is washed to remove undesirable byproducts and salts and dewatered to yield a filter cake of flocculated pigmentary titanium dioxide. Dewatering of the slurry readily can be accomplished by known techniques such as by filtration utilizing conventional rotary vacuum drum, or disc filters, or pressure filters of the plate, leaf and disc type. The resulting filter cake of flocculated pigmentary titanium dioxide will contain from about 25 to about 50 weight percent of free water and from about 50 to about 75 weight percent of the flocculated pigmentary titanium dioxide based on the weight of the filter cake. The exact amount of free water content in the filter cake will depend upon the type of filtration apparatus employed.

In the conventional chloride process, the above filter cake would be dried and subjected to fluid energy milling to produce a finished pigmentary titanium dioxide having particle sizes in the range of from about 0.01 to about 0.5 microns and preferably in the range of from about 0.2 to about 0.4 microns. Such pigmentary titanium dioxide is particularly useful in the preparation of various coating formulations. However, as noted hereinabove, such pigmentary titanium dioxide often is, due to its extremely small particle size and low bulk density, unsuited for use in the manufacture of glass and ceramic products.

It now has been found that when the filter cake produced in the above generally described chloride process is treated in accordance with the process of this invention, a nonpigmentary titanium dioxide product suitable for use in the manufacture of glass and ceramics can be produced. In accordance with the present invention, the above described filter cake first is converted into solid preforms either by breaking the filter cake into irregular shaped pieces or by extruding the filter cake into predetermined forms such as, for example, pellets, rods, and the like. The manner by which the filter cake is converted into these solid preforms and the particular shape or form of the solid preforms produced is not critical and, in general, will depend upon the free water content of the filter cake.

The solid preforms, which contain essentially the same free water content and weight percent of flocculated pigmentary titanium dioxide as the filter cake then are subjected to drying at elevated temperatures to reduce the free water content contained therein to a level of less than about 5 weight percent based on the weight of the dried solid preforms. Drying of the solid preforms to achieve such reduced levels of free water can be achieved using conventional drying apparatus such as, for example, well-known tunnel and belt drying apparatus. Generally, this drying of the solid preforms will be carried out at elevated temperatures ranging from about 125° C. to about 700° C.

Following drying of the solid preforms, the solid preforms are reduced in size by comminution to provide the desired free flowing powder. The free flowing powder will comprise nonpigmentary titanium dioxide granular aggregates a substantial portion, e.g., at least 75 weight percent, and preferably, at least 85 weight percent of which will range in size from a minimum limiting particle size of about 150 microns (100 mesh) to a maximum limiting particle size of about 1700 microns (10 mesh). The free flowing powder further is characterized by exhibiting bulk densities ranging from about 0.5 g/cc to about 3.5 g/cc and preferably from about 0.8 g/cc to about 1.2 g/cc. Free flowing powders comprised of nonpigmentary titanium dioxide granular aggregates within the above disclosed size and bulk density ranges easily can be incorporated into a glass melt thus avoiding the hereinabove mentioned problems associated with the use of pigmentary titanium dioxide.

Comminution of the solid preforms to free flowing powders possessing the above disclosed characteristics readily can be achieved using a wide variety of crushing and grinding equipment. Particularly good results have been obtained using both smooth-roll and corrugated-roll crushing apparatus.

In a further embodiment of this invention, the free flowing powders of nonpigmentary titanium dioxide granular aggregates can be subjected to size enlargement to reduce the quantity of the smaller size granular aggregates contained therein. In this embodiment, the free flowing powders first are wetted with water in amounts ranging from about 0.25 to about 11.0 weight percent, and preferably from about 0.25 to about 5.0 weight percent, based on the weight of the powders. The wetted powders then are agglomerated by, for example, introducing the wetted powders into a conventional drum-type pelletizer. Within the drum-type pelletizer, a substantial portion of those granular aggregates ranging of a size smaller than about 150 microns (100 mesh) are converted into granular aggregates larger than about 150 microns. During this size enlargement, the maximum limiting particle size remains substantially the same, i.e., about 1700 microns (10 mesh). Typically, this size enlargement results in the production of free flowing powders wherein at least about 95 weight percent of the granular aggregates contained therein range in size from the minimum limiting particle size of about 150 microns to the maximum limiting particle size of about 1700 microns.

The following examples are presented for purposes of illustration only and are not to be construed as limiting the scope of the invention. All parts and percentages are by weight unless otherwise specified.

Examples 1-2

Two free flowing powders comprised of nonpigmentary titanium dioxide granular aggregates are prepared in accordance with the process of the present invention as follows:

To a laboratory scale roll crusher, equipped with two pairs of 9-inch by 12-inch chilled iron rollers and operated at a speed of 720 rpm, is fed a quantity of titanium dioxide substantially in the form of rod-shaped preforms measuring approximately ¼ inch by 1 to 2 inches. The preforms are produced by extrusion of a highly viscous filter cake of flocculated pigmentary titanium dioxide produced by the chloride process described hereinabove and containing approximately 40 weight percent of free water. The preforms are dried at an elevated temperature of about 180° C. for a time sufficient to reduce the free water content of the preforms to a level of less than about 0.5 weight percent.

The dried preforms then are subjected to comminution by feeding the preforms to the above described roll crusher at a rate of 425 pounds per hour. Screen analysis of the two free flowing powders prepared therefrom are determined using Tyler screen sieves and the results thereof are set forth in the Table below.

TABLE I

| Example No. | 1[a] | 2[b] |
|---|---|---|
| Bulk Density, g/cc | 1.23 | 1.21 |
| Dry Flow[c], mm | 4-6 | 4-6 |
| Size Distribution, cumulative Wt. % larger than: | | |
| 10 mesh | 0.8 | 4.2 |
| 20 mesh | 33.6 | 39.4 |
| 35 mesh | 61.3 | 65.3 |
| 65 mesh | 71.4 | 75.3 |
| 80 mesh | 82.3 | 84.9 |
| 100 mesh | 85.7 | 87.8 |

[a]Roll crusher equipped with corrugated rolls.
[b]Roll crusher equipped with smooth rolls.
[c]Smallest diameter tube through which the sample will flow without assistance.

As disclosed hereinabove, powders of nonpigmentary titanium dioxide possessing bulk densities ranging from about 0.5 g/cc and 3.5 g/cc and comprised of granular aggregates, a substantial portion of which range in size from about +100 mesh (150 microns) to about −10 mesh (1700 microns), easily can be incorporated into a glass melt. From the data set forth in Table I, it is clear that the nonpigmentary titanium dioxide powders (Examples 1 and 2) produced in accordance with this invention possess these characteristics. For example, the bulk densities of the powders of Examples 1 and 2 are 1.23 g/cc and 1/21 g/cc, respectively, values well within the bulk density range given above. Also, a substantial portion of the granular aggregates comprising these powders, e.g., 84.9 weight percent for the powder of Example 1 and 83.6 weight percent for the powder of Example 2, fall within the above disclosed particle size range. Thus, the nonpigmentary titanium dioxide powders prepared in Examples 1 and 2 above easily can be incorporated into a glass melt and their use readily avoids the difficulties associated with the use of pigmentary titanium dioxide, i.e., pigment losses from dusting and the formation of large agglomerates which tend to sink to the bottom of the glass melt where they can form sintered masses.

EXAMPLES 3-6

To demonstrate the further embodiment of the present invention, i.e., size enlargement, the free flowing powders of Examples 1 and 2 above are combined in equal portions into a powdery blend. Tyler screen analysis of this powdery blend indicates a particle size distribution for the granular aggregates contained in the blend as follows: 0.1 weight percent of the granular aggregates are larger than 10 mesh in size; 86.2 weight percent of the granular aggregates range from +100 mesh to −10 mesh in size; and 13.7 weight percent of the aggregates are smaller than 100 mesh in size.

The above powdery blend is divided into four separate samples of equal proportions and each sample subjected to size enlargement by pelletization in a 14-inch drum pelletizer rotated at a speed of 30 rpm. During each pelletizing operation water is sprayed into the pelletizer to agglomerate the finer granular aggregates contained in each sample. Data relating to the pelletized samples are set forth in Table II below.

TABLE II

| Example Number | Particle Size Distribution, Wt. % | | | Added H₂O, Wt. % |
|---|---|---|---|---|
| | +10 mesh | 10-100 mesh | −100 mesh | |
| 3 | 0.1 | 98.9 | 1.0 | 11.0 |
| 4 | 0.0 | 99.4 | 0.6 | 4.5 |
| 5 | 0.0 | 98.4 | 1.6 | 4.0 |
| 6 | 0.0 | 95.0 | 5.0 | 2.0 |

A comparison of the particle size distribution data set forth in Table II for the pelletized samples with the particle size distribution data for the original powdery blend disclose a significant reduction having been effected in the quantity of granular aggregates smaller than 100 mesh in size. Furthermore, it is clear from the above data that this reduction is achieved while the quantity of granular aggregates larger than 10 mesh remains substantially the same or, with regard to Examples 4-6, actually decreases.

When the nonpigmentary titanium dioxide powders produced in accordance with the process of this invention are dry blended with other glass forming ingredients and the resulting blend heated to the melt, all of the ingredients, including the nonpigmentary titanium dioxide powders, will undergo rapid and uniform melting to produce a clear, homogenous glass melt. In contrast, when pigmentary titanium dioxide powders are dry blended with other glass forming ingredients and the blend heated to the melt, at least a portion of the pigmentary titanium dioxide can rise to the surface of the melt where it can be lost through dusting and at least a portion can undergo agglomeration and remain suspended in the melt or settle to the bottom of the melt wherein it can undergo sintering into a solid mass. In both instances, the pigmentary titanium dioxide is lost to the glass batch. The following examples illustrate the use of nonpigmentary titanium dioxide powders prepared by this invention compared to the use of a conventional pigmentary titanium dioxide powder.

EXAMPLE 7

To demonstrate the effectiveness of the instant invention to produce a powdery nonpigmentary titanium dioxide suitable for use in the manufacture of glass, a molten glass batch is prepared as follows:

An enamel glass frit composition comprising 8.7 parts of feldspar, 11.4 parts of borax, 25.5 parts of sand, 14.1 parts of soda ash, 5.1 parts of sodium nitrate, 7.8 parts of red lead, 5.1 parts of zinc oxide, 3.0 parts of calcium carbonate, 10.8 parts of antimony trioxide and 1.7 parts of sodium silicafluoride is dry blended. To this dry blend is added 6.8 parts of a nonpigmentary titanium dioxide powder produced in accordance with the process of this invention. This powder has a bulk density of 1.10 g/cc and is comprised of granular aggregates, 95 weight percent of which range in size of from 150 microns (100 mesh) to about 1700 microns (10 mesh). The dry blended batch is melted by heating to a temperature of 1230° C. in a stirred crucible and maintained at this temperature for a period of one hour. All of the dry ingredients, including the nonpigmentary titanium dioxide powder, melt rapidly to form a homogenous glass mixture. None of the nonpigmentary titanium dioxide powder tends to rise to the surface of, or remain suspended in the glass melt or to settle to the bottom of the crucible when melting of the batch is completed.

COMPARATIVE EXAMPLE

For comparative purposes, a conventional pigmentary titanium dioxide is used in the dry blended glass composition of Example 7 in place of a nonpigmentary titanium dioxide powder produced in accordance with the process of this invention. Upon melting of this dry blended glass composition, not all of the added pigmentary titanium dioxide will dissolve. At least a portion of the pigmentary titanium dioxide will rise to the surface of the glass melt while a further portion remains undissolved and suspended in the glass melt. The resulting product is a nonhomogenous glass mixture containing numerous sintered black masses of pigmentary titanium dioxide suspended therein.

From the above description and examples, it is clearly shown that the process of this invention is capable of producing titanium dioxide powder products well suited for use in glass and ceramic manufacture. These titanium dioxide powder products have higher bulk densities and are comprised of granular aggregates of a size larger than the particles of pigmentary titanium dioxide. These characteristics render the titanium dioxide powder products produced in accordance with this invention readily dispersible in glass and ceramic melts and, thus, avoiding the problems associated with the use of convention pigmentary titanium dioxide powders.

While the present invention has been described in respect to what at present is considered to be the preferred embodiments, it will be understood that changes and modifications can be made therein without departing from the true scope thereof as defined in the appended claims.

We claim:

1. A process for preparing free flowing powders of nonpigmentary titanium dioxide granular aggregates useful in the manufacture of glass and ceramic products consisting of:

forming a filter cake comprised of free water and flocculated pigmentary titanium dioxide particles by dewatering a flocculated slurry of pigmentary titanium dioxide particles, said pigmentary particles being prepared by oxidation of titanium tetrachloride in a vapor phase;

preparing solid preforms comprised of said free water and said flocculated pigmentary titanium dioxide particles from said filter cake by breaking or extruding said filter cake to form said solid preforms;

drying said solid preforms to reduce said free water contained therein; and subjecting said dried solid preforms to comminution to effect a reduction in size of said solid preforms to provide said free flowing powders of nonpigmentary titanium dioxide granular aggregates said free flowing powders having bulk densities ranging from about 0.5 g/cc to about 3.5 g/cc and wherein at least about 75 weight percent of the nonpigmentary granular aggregates comprising said free flowing powders range in size from a minimum limiting particle size of about 150 microns to a maximum limiting particle size of about 1700 microns.

2. The process of claim 1 wherein said solid preforms contain from about 25 to about 50 weight percent of free water and from about 50 to about 75 weight percent of said flocculated pigmentary titanium dioxide particles.

3. The process of claim 1 wherein said solid preforms are dried at elevated temperatures to reduce the free water content thereof to a level of less than about 5.0 weight percent based on the weight of the preforms.

4. The process of claim 3 wherein said solid preforms are dried at elevated temperatures ranging from about 125° C. to about 700° C.

5. The process of claim 1 wherein said free flowing powders have bulk densities ranging from about 0.8 g/cc to about 1.2 g/cc.

6. The process of claim 1 wherein at least 85 weight percent of said nonpigmentary titanium dioxide granular aggregates comprising said free flowing powders range in size from about 150 microns to about 1700 microns.

7. A process for preparing free flowing powders of nonpigmentary titanium dioxide granular aggregates consisting of:
  forming a filter cake comprised of from about 25 to about 50 weight percent of free water and from about 50 to about 75 weight percent of flocculated pigmentary titanium dioxide particles by dewatering a flocculated slurry of pigmentary titanium dioxide particles, said pigmentary particles being prepared by oxidation of titanium tetrachloride in a vapor phase;
  preparing solid preforms comprised of said free water and said flocculated pigmentary titanium dioxide particles, said preforms containing from about 25 to about 50 weight percent of said free water and from about 50 to about 75 weight percent of said flocculated pigmentary titanium dioxide particles based on the weight of said solid preforms said solid preforms being prepared from said filter cake by breaking or extruding said filter cake into said solid preforms;
  drying said solid preforms at elevated temperatures to reduce the free water contained therein to levels of less than about 5.0 weight percent based on the weight of said solid preforms; and
  subjecting said dried solid preforms to comminution to effect a reduction in size of said solid preforms to provide said free flowing powders of nonpigmentary titanium dioxide granular aggregates, said free flowing powders having bulk densities ranging from about 0.5 g/cc to about 3.5 g/cc and wherein at least about 75 weight percent of the nonpigmentary granular aggregates comprising said free flowing powders range in size from a minimum limiting particle size of about 150 microns to a maximum limiting particle size of about 1700 microns.

8. The process of claim 7 wherein said free flowing powders have bulk densities ranging from about 0.8 g/cc to about 1.2 g/cc.

9. The process of claim 7 wherein said solid preforms are dried at elevated temperatures ranging from about 125° C. to about 700° C.

10. The process of claim 7 wherein at least 85 weight percent of said nonpigmentary titanium dioxide granular aggregates comprising said free flowing powders range in size from about 150 microns to about 1700 microns.

11. The process of claim 1 wherein said filter cake is comprised of from about 25 to about 50 weight percent of said free water and from about 50 to about 75 weight percent of said flocculated pigmentary titanium dioxide particles.

* * * * *